US012524784B2

(12) United States Patent
Pearson et al.

(10) Patent No.: US 12,524,784 B2
(45) Date of Patent: *Jan. 13, 2026

(54) SYSTEMS AND METHODS FOR PROVIDING TARGETED CONTENT ACROSS USER CHANNELS

(71) Applicant: Yahoo Ad Tech LLC, Dulles, VA (US)

(72) Inventors: Eliot L. Pearson, Baltimore, MD (US);
Elena Hearty, Severna Park, MD (US);
Jay Crystal, Arlington, VA (US);
Douglas Weltman, Sharon, CT (US);
Marcy Stone, Brooklyn, NY (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,237

(22) Filed: Jul. 12, 2023

(65) Prior Publication Data

US 2023/0360090 A1    Nov. 9, 2023

Related U.S. Application Data

(63) Continuation of application No. 17/650,469, filed on Feb. 9, 2022, now Pat. No. 11,741,506, which is a
(Continued)

(51) Int. Cl.
*G06Q 30/0251* (2023.01)
*G06Q 30/0241* (2023.01)

(52) U.S. Cl.
CPC ..... *G06Q 30/0271* (2013.01); *G06Q 30/0251* (2013.01); *G06Q 30/0255* (2013.01); *G06Q 30/0267* (2013.01); *G06Q 30/0277* (2013.01)

(58) Field of Classification Search
CPC .......... G06Q 30/0271; G06Q 30/0251; G06Q 30/0267; G06Q 30/0277; G06Q 30/0255
See application file for complete search history.

(56) References Cited

U.S. PATENT DOCUMENTS 8,644,805 B2    2/2014  Earnshaw et al.
9,008,631 B2    4/2015  Small et al.
(Continued)

OTHER PUBLICATIONS

R. Díaz-Morales, "Cross-Device Tracking: Matching Devices and Cookies," 2015 IEEE International Conference on Data Mining Workshop (ICDMW), Atlantic City, NJ, USA, 2015, pp. 1699-1704 (Year: 2015).*

(Continued)

*Primary Examiner* — Matthew L Hamilton
(74) *Attorney, Agent, or Firm* — Bookoff McAndrews, PLLC (57) ABSTRACT

A method of providing targeted content across user channels includes receiving a plurality of device activity events on a user device, storing the received plurality of device activity events, creating an audience population based on the stored device activity events, determining links for additional secondary user devices based on the user device, creating a cross-channel advertising campaign targeting the determined audience population, and running the cross-channel advertising campaign based on the device activity and the determined additional secondary user devices.

20 Claims, 8 Drawing Sheets

Related U.S. Application Data continuation of application No. 17/039,181, filed on Sep. 30, 2020, now Pat. No. 11,276,087, which is a continuation of application No. 15/697,665, filed on Sep. 7, 2017, now Pat. No. 10,825,060.

(56) References Cited

U.S. PATENT DOCUMENTS

| | | | |
|---|---|---|---|
| 9,723,157 | B2 | 8/2017 | Brown |
| 9,741,026 | B1 | 8/2017 | Grassadonia |
| 10,079,939 | B1 | 9/2018 | Bostick et al. |
| 11,010,763 | B1 | 5/2021 | Fillinger |
| 2007/0047726 | A1 | 3/2007 | Jabbour et al. |
| 2008/0273677 | A1 | 11/2008 | Alfano et al. |
| 2009/0061832 | A1 | 3/2009 | Goggans et al. |
| 2010/0080363 | A1* | 4/2010 | Lesher ............ H04M 3/4872 379/88.19 |
| 2011/0214082 | A1 | 9/2011 | Osterhout et al. |
| 2013/0136253 | A1* | 5/2013 | Liberman Ben-Ami ............ H04M 3/5191 379/265.09 |
| 2013/0185196 | A1 | 7/2013 | Kadur et al. |
| 2013/0324094 | A1* | 12/2013 | Unetich ............ H04M 1/64 455/414.1 |
| 2014/0019377 | A1 | 1/2014 | Bhaumik et al. |
| 2014/0057610 | A1* | 2/2014 | Olincy ............ H04W 4/16 455/414.1 |
| 2014/0095316 | A1 | 4/2014 | Yasin et al. |
| 2014/0120864 | A1 | 5/2014 | Manolarakis et al. |
| 2014/0207567 | A1 | 7/2014 | Gould et al. |
| 2014/0278953 | A1 | 9/2014 | Ismail et al. |
| 2014/0321625 | A1* | 10/2014 | Brown ............ H04M 15/61 379/93.12 |
| 2014/0344060 | A1 | 11/2014 | Watfa et al. |
| 2015/0195400 | A1* | 7/2015 | Faaborg ............ H04M 1/576 455/415 |
| 2015/0281450 | A1 | 10/2015 | Shapiro et al. |
| 2016/0072840 | A1 | 3/2016 | Iyer et al. |
| 2016/0155148 | A1* | 6/2016 | Ismail ............ H04M 3/2218 705/14.53 |
| 2016/0343034 | A1* | 11/2016 | Green ............ H04M 3/42059 |
| 2016/0379245 | A1 | 12/2016 | Dey et al. |
| 2017/0134512 | A1* | 5/2017 | Wyatt ............ H04L 67/75 |
| 2017/0323299 | A1* | 11/2017 | Davis ............ G06Q 20/204 |
| 2018/0191895 | A1 | 7/2018 | Zhao et al. |
| 2019/0074920 | A1 | 3/2019 | MacKenzie et al. |
| 2021/0383382 | A1 | 12/2021 | Harris |

OTHER PUBLICATIONS

Howell, Karina, Essential Steps for Providing a Great Cross-Channel Customer Experience, Technology Marketing Corporation, Sep. 2014.

Marin Software Publishes Playbook on Creating Effective Cross-Channel Ad Campaigns, 2017 News Bites—Media & Broadcasting (2017).

An Insight into the US Digital Advertising Market 2016—from Single Channel to Cross Channel Advertising, Feb. 25, 2016, PR Newswire (Year: 2016).

* cited by examiner

SYSTEMS AND METHODS FOR PROVIDING TARGETED CONTENT ACROSS USER CHANNELS

CROSS-REFERENCE TO RELATED APPLICATION(S)

This patent application is a continuation of and claims the benefit of priority to U.S. application Ser. No. 17/650,649, filed on Jul. 13, 2023, which is a continuation of U.S. application Ser. No. 17/039,181, filed on Sep. 30, 2020, now U.S. Pat. No. 11,276,087, which is a continuation of and claims the benefit of priority to U.S. application Ser. No. 15/697,665, filed Sep. 7, 2017, now U.S. Pat. No. 10,825,060, the entireties of which are incorporated herein by reference.

TECHNICAL FIELD

Various embodiments of the present disclosure relate generally to providing targeted messages to users and, more particularly, to providing such messages across user channels based on a user's online activity on multiple devices and the user's inbound and outbound telephone call activity.

BACKGROUND

In recent years, people have started spending more and more time browsing content on the Internet, as opposed to traditional sources. As a result, the value of advertising on web pages has risen significantly, and techniques for targeting demographics of interest have become very advanced.

Advertising networks typically have hundreds or thousands of partners (often referred to as "publishers") that publish online content along with "ad tags" provided by their partner ad network. For example, each of a news website (www.news.com), a blog (www.blog.com), and an informational website (www.info.com), among others, may engage an ad network to efficiently and profitably advertise to those websites' viewers. The ad network provides each of those sites with an ad tag having the ad network's domain, e.g., "adnetwork.com." For any visitors, or more specifically, visitors' browsers that allow third party cookies, the ad network may access cookie data of visitors to its partners' sites (i.e., across its entire network of sites), even though those sites' domains (e.g., www.news.com, etc.) do not match the ad network's domain. Specifically, the ad network's ad tag on each site may access cookie data associated with the domain of the ad tag. As a result, the ad network may learn more about a user's browsing history across its network, and therefore more about the user's likely demographics, interests, purchasing goals, and other useful advertising information.

However, such advertising models and the use of cookies on a particular device may not allow an advertiser or other content provider to target content to a user based on the user's online activity across multiple devices or the user's inbound and outbound telephone call activity.

The present disclosure is directed to overcoming one or more of these above-referenced challenges.

SUMMARY OF THE DISCLOSURE

According to certain aspects of the disclosure, systems and methods are disclosed for providing targeted content across user channels.

In one embodiment, a computer-implemented method is disclosed for providing targeted content across user channels. The method includes receiving a plurality of device activity events on a user device, storing the received plurality of device activity events, creating an audience population based on the stored device activity events, determining links for additional secondary user devices based on the user device, creating a cross-channel advertising campaign targeting the determined audience population, and running the cross-channel advertising campaign based on the device activity and the determined additional secondary user devices.

According to certain aspects of the disclosure, non-transitory computer readable media are disclosed storing a program causing a computer to execute a method of providing targeted content across user channels. One method comprises: receiving a plurality of device activity events on a user device, storing the received plurality of device activity events, creating an audience population based on the stored device activity events, determining links for additional secondary user devices based on the user device, creating a cross-channel advertising campaign targeting the determined audience population, and running the cross-channel advertising campaign based on the device activity and the determined additional secondary user devices.

In accordance with another embodiment, a system is disclosed for providing targeted content across user channels. The system comprises: a memory having processor-readable instructions stored therein; and a processor configured to access the memory and execute the processor-readable instructions, which when executed by the processor configures the processor to perform a plurality of functions, including functions to: receive a plurality of device activity events on a user device, store the received plurality of device activity events, creating an audience population based on the stored device activity events, determine links for additional secondary user devices based on the user device, create a cross-channel advertising campaign targeting the determined audience population, and run the cross-channel advertising campaign based on the device activity and the determined additional secondary user devices.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that an advertiser or other content provider to target content to a user based on the user's online activity across multiple devices or the user's inbound and outbound telephone call activity. The disclosed systems and methods discussed below may allow expedited customer relationship management, improved recipient response rate, and enhanced revenue from channels not previously available.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to providing targeted messages to users.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

User activity by which users access the Internet may be considered to be one channel of user activity. Other type of activity, such as placing or receiving telephone calls using a mobile device may be considered to be a different channel of user activity. According to one or embodiments, activity in one channel may be used to serve ads on a user's device in a different channel. For example, a user's Internet activity such as, for example, browsing history, demographic data, behavioral information, user profiling information, purchase history, etc., may be used to serve ads on a user's mobile device when placing or receiving a telephone call.

For the user, such advertisements or targeted messages may provide benefits such as, for example, enhanced inbound call transparency, call blocking, flagging of fraudulent, unsolicited calls, faster, more interactive experience than voicemail, etc. For the advertiser or originator of the advertisement or targeted message, such advertisements or targeted messages may provide benefits such as, for example, expedited customer relationship management, improved recipient response rate, and enhanced revenue from channels not previously available.

Such advertisements or targeted messages may be employed in various scenarios such as: a credit card provider driving new card activations, a cruise line selling remnant cruise inventory, a pharmacy notifying a user of prescription refills, a car dealer service department reminding customers of service due or completed, survey, market research and polling firms contacting potential participants, a retailer calls a customer to confirm an order and schedule a deliver, a utility company calls a customer to notify of an account balance due, etc.

By providing targeted content across user channels, advertisers and merchants may engage with existing or new clients, may benefit from improved client interaction, and may access new channels for engaging new or existing customers. Such communications may replace the significantly more intrusive alternative of having to speak to a representative, and, thus, improving the customer experience. Such communications may also be more likely to influence the recipient's behavior than a digital advertisement impression, thus, potentially yielding higher response rate. Such communications may further improve call center efficiency by obviating the need for customers to speak directly to recipient.

Figure 1:
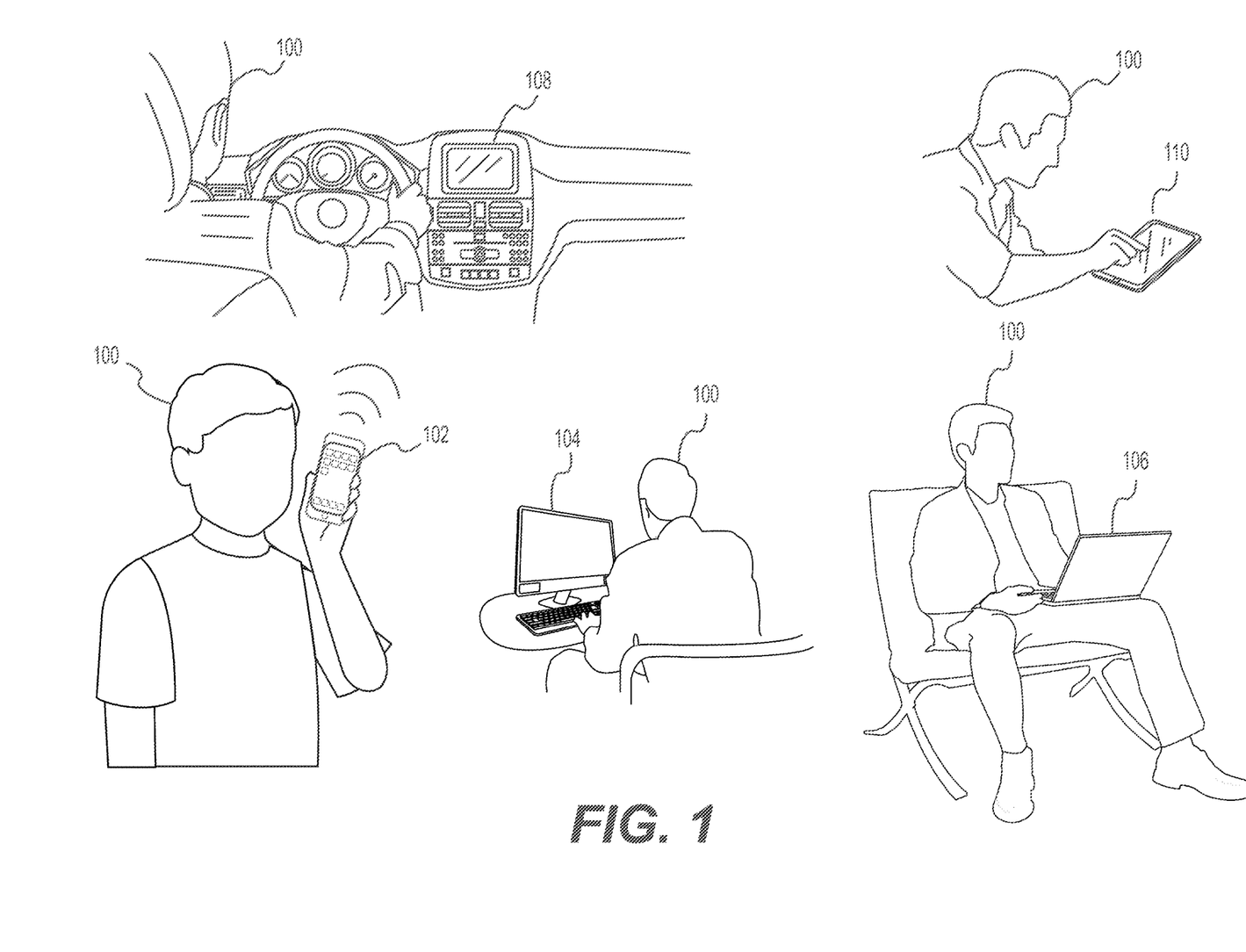
FIG. 1 is a series of schematic diagrams depicting exemplary environments in which users may use disclosed devices and methods according to one or more embodiments.

FIG. 1 is a schematic diagram of a series of environments in which users may access Internet content and advertising, according to exemplary embodiments of the present disclosure. Specifically, FIG. 1 depicts how the same user 100 may access the Internet using any number or type of Internet-enabled devices, such as, for example, a mobile device 102 (e.g., smartphone, PDA, etc.), a work computer 104 (e.g., such as a PC, Windows, Mac, etc., whether desktop or laptop), a home computer 106 (e.g., a PC or Mac laptop or desktop), an automobile computer 108 (e.g., whether OEM or after-market), a tablet 110, or any other type of kiosk, computer, or mobile device connected to the Internet through a wired or wireless connection. For example, a typical user might wake up in the morning and check the weather and his or her e-mail on his or her smartphone 102. The user may then drive to work and access Internet content, such as traffic or news, through his or her automobile computer 108. The user may then operate a computer 104 upon arriving at his or her workplace, including to access Internet content, whether related to work activities and/or personal activities. The user may then return home in the evening and use one or more of a home computer 106 and a tablet 110. Of course, the preceding scenario is only exemplary in nature, and users' Internet habits may vary widely in terms of which devices they use at given locations and times. For example, many users may use a tablet 110 only at work or only at home, while other users may use a tablet 110 while at home and at work, and for both personal and professional activities. Likewise, some users may use a mobile device 102 to access both personal and professional Internet content and e-mail throughout the day, even while also using a work computer 104. In addition, some users may use a mobile device 102 to place and receive telephone calls throughout the day, even while also using a work computer 104 or other type of Internet-enabled device. Also, a user may use a home computer 106 at non-traditional times of the day, and may use the home computer 106 to perform professional activities, whether during the day or evening.

Figure 2:
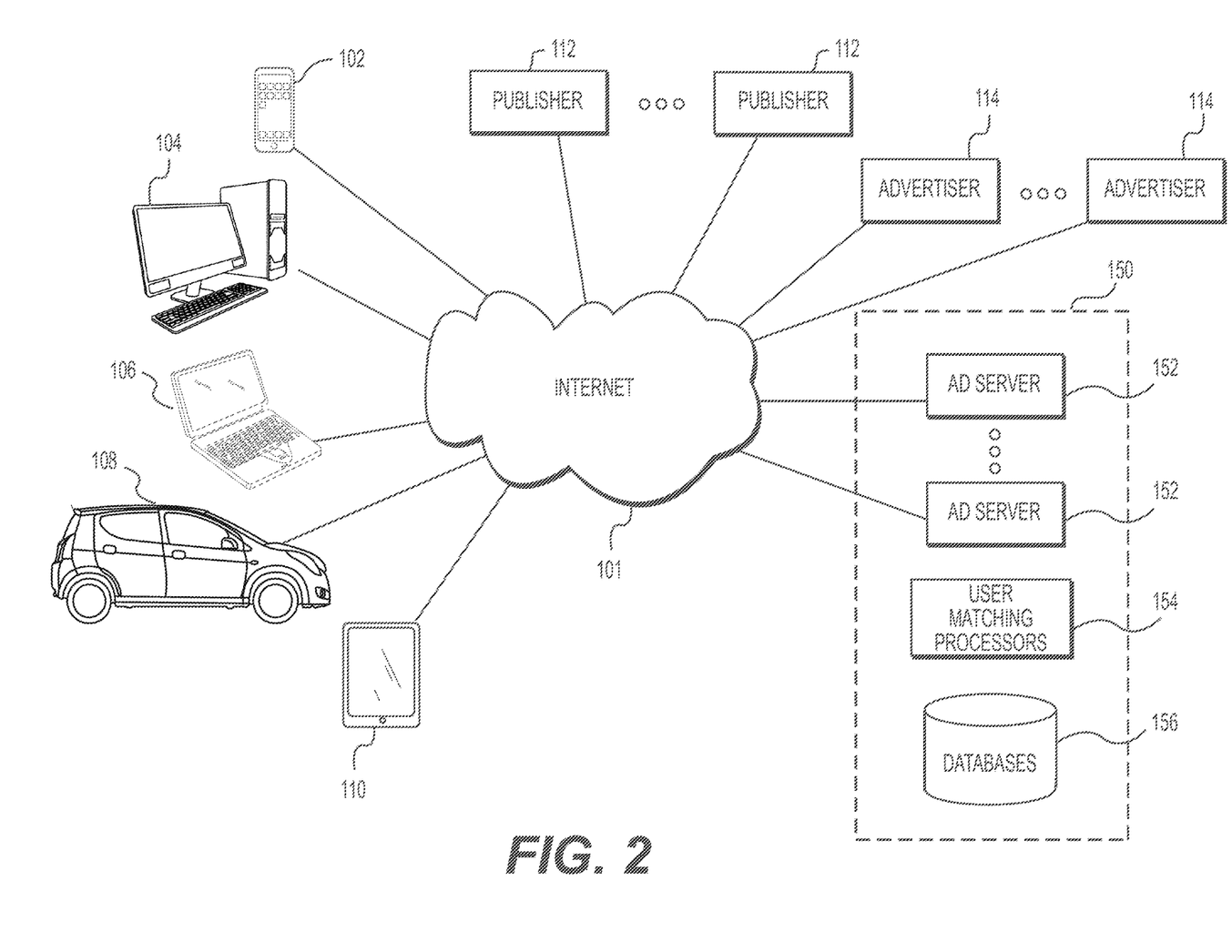
FIG. 2 depicts a schematic diagram of an exemplary environment and system for synchronizing user advertising IDs across devices and browsers, according to one or more embodiments.

FIG. 2 illustrates an exemplary environment in which users may access the Internet using multiple devices, including a plurality of user devices 102-110. FIG. 2 also illustrates an exemplary system for synchronizing user advertising IDs across devices and browsers, the system including one or more of: publisher servers 112, advertiser servers 114, and synchronization server systems 150, all disposed in communication with the Internet 101. In one embodiment, publisher servers 112 and advertiser servers 114 may be owned and operated by publishing and advertising entities, respectively, and not strictly part of the same system as synchronization server systems 150.

In one embodiment, user devices 102-110 may be owned and used by one or more people, who may be viewers of web pages over the Internet, either through a mobile browser or web browser stored on respective user devices. As described above, user devices 102-110 may include any type of electronic device configured to send and receive data, such as websites and electronic advertisements, over the Internet. For example, each of user devices 102-110 may include a server, personal computer, tablet computer, mobile device, smartphone, and/or personal digital assistant ("PDA") disposed in communication with the Internet. In addition, mobile device or smartphone 102 may also be used to place and receive telephone calls. Each of user devices 102-110 may have a web browser or mobile browser installed for receiving and displaying web and/or ad content from web servers. Thus, each of user devices 102-110 may be configured to receive and display data that is received from one or more of publisher servers 112, advertiser servers 114, and synchronization server systems 150, among any other web servers, domain name system ("DNS") servers, content distribution network ("CDN") servers, etc., over the Internet. As described above, in one embodiment, a user may own and, simultaneously or intermittently, use one or more of user devices 102-110, whether of similar or different type.

Publisher web servers 112 may be owned and/or operated by any entities having inventories of available online advertising space. For example, publishers may include online content providers, search engines, e-mail programs, or any other online site or program having online user traffic. Publishers may interact with user devices 102-110, advertiser servers 114, and synchronization server systems 150, through publisher servers 112 connected to the Internet. Thus, publishers may be able to communicate inventory information, such as site information, demographic information, cost information, etc., to other entities in the environment of FIG. 2.

Advertiser servers 114 may be owned and/or operated by any entities having content, such as online advertisements (e.g., display ads, banner ads, pop-ups, etc.) desired to be delivered to online users. Advertisers may interact with user devices 102-110, publisher servers 112, and/or synchronization server systems 150, through advertiser servers 114 connected to the Internet 101. Thus, advertisers may be able to communicate advertising information, such as ad information, targeting information, consumer information, budget information, bidding information, etc., to other entities in the environment of FIG. 2.

Synchronization server systems 150 may be configured to interact with one or more of user devices 102-110, publisher servers 112, and advertiser servers 114 over the Internet 101 to perform any of the presently disclosed techniques and methods. In one embodiment, synchronization server systems 150 may include one or more of: a plurality of ad servers 152, synchronization processor(s) 154, and database (s) 156. Of course, it should be appreciated that ad servers 152 may be operated by an operator only contractually or even loosely affiliated with an operator of synchronization processor 154. Alternatively, the ad servers 152 and synchronization processor 154 may be operated by the same advertising entity or online entity.

Ad servers 152 may include any type of servers configured to process advertising information from advertisers and/or site information from publishers, and send and receive ad requests and information from user devices 102-110, either directly or indirectly. In one embodiment, ad servers 152 may be owned and operated by an ad network, which may be a business that receives ad buys from advertisers, and serves ads on inventory supplied by publishers. Thus, an ad network operating ad servers 152 may receive revenue from advertisers, purchase impressions from publishers, and serve ads on publishers' web pages when viewers associated with user devices 102-110 view those web pages. According to aspects of the present disclosure, ad servers 152 may be configured to interact with synchronizing processor 154, such as through one or more APIs associated with synchronizing processor 154, to obtain one or more of: unique user IDs, cookie data, browsing history, demographic data, user profile data, etc., in response to interaction from user devices 102-110.

In certain embodiments, ad servers 152 may be remote web servers that receive advertising information from advertisers and serve ads to be placed by publishers. Ad servers 152 may be configured to serve ads across various domains of publishers, for example, based on advertising information provided by advertisers. Ad servers 152 may also be configured to serve ads based on contextual targeting of web sites, search results, and/or user profile information. In some embodiments, ad servers 152 may be configured to serve ads based on ad tags served by advertiser servers 114 and/or publisher servers 112, and on ad requests received from user devices 102-110. Ad servers 152 may be configured to send and receive data from user devices 102-110, publisher servers 112, advertiser servers 114, and/or synchronizing processor 154, over the Internet.

Ad servers 152 and synchronizing processor 154, either alone or in combination, may include any type or combination of computing systems, such as clustered computing machines and/or servers. In one embodiment, each of ad servers 152 and synchronizing processor 154 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 3:
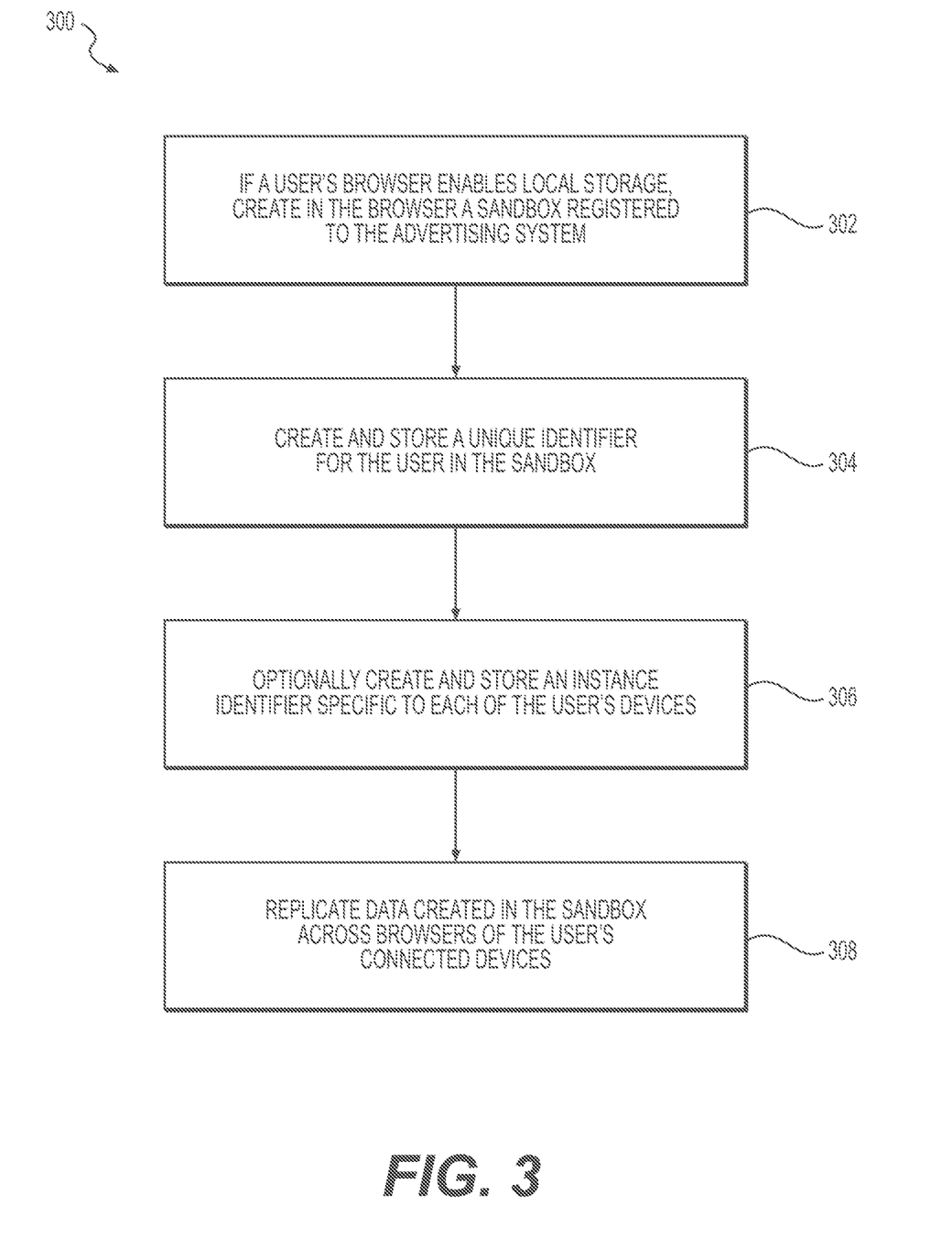
FIG. 3 depicts a flowchart of a method for synchronizing user advertising IDs across devices and browsers, according to one or more embodiments.
Figure 4:
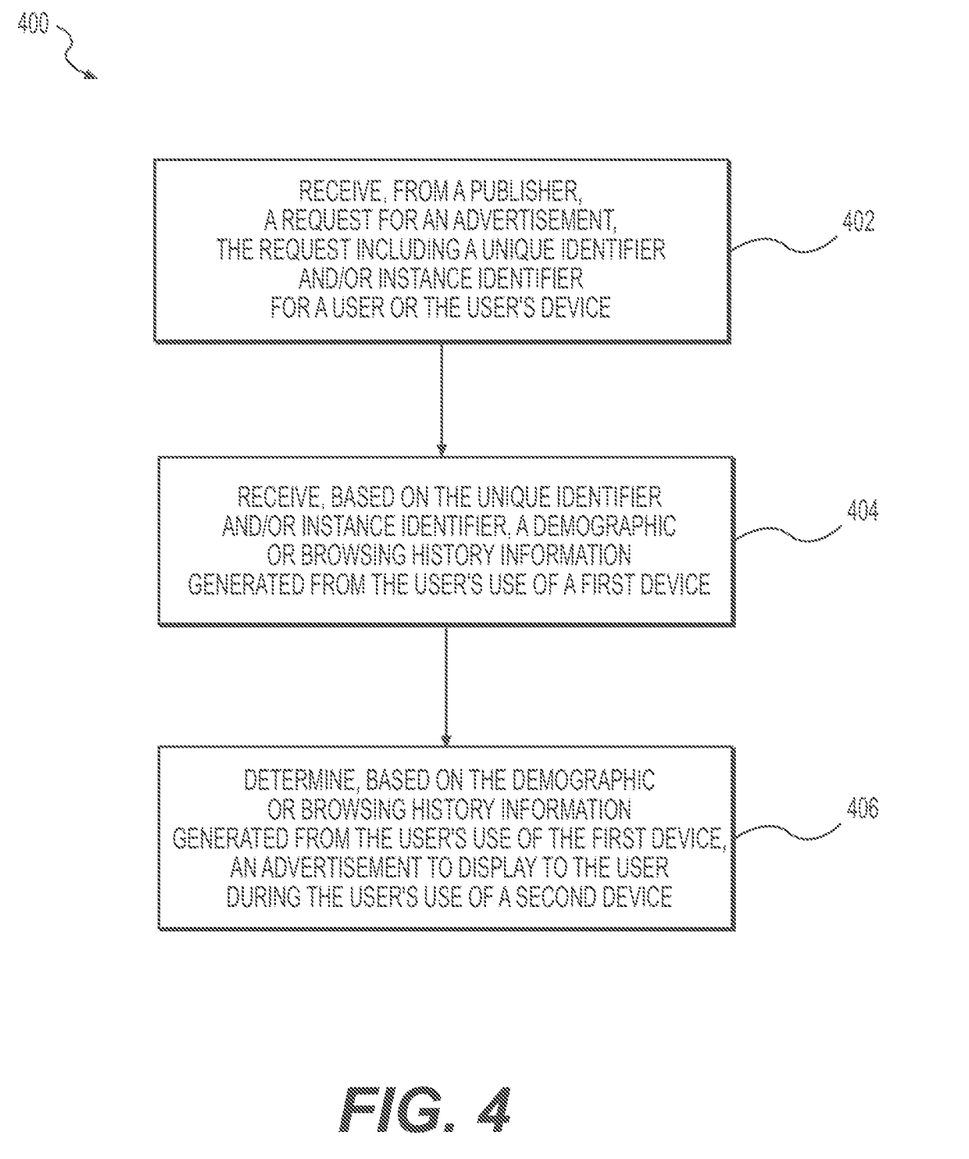
FIG. 4 depicts a flowchart of a method for performing Internet advertising techniques based on user advertising IDs synchronized across devices and browsers, according to one or more embodiments.
Figure 5:
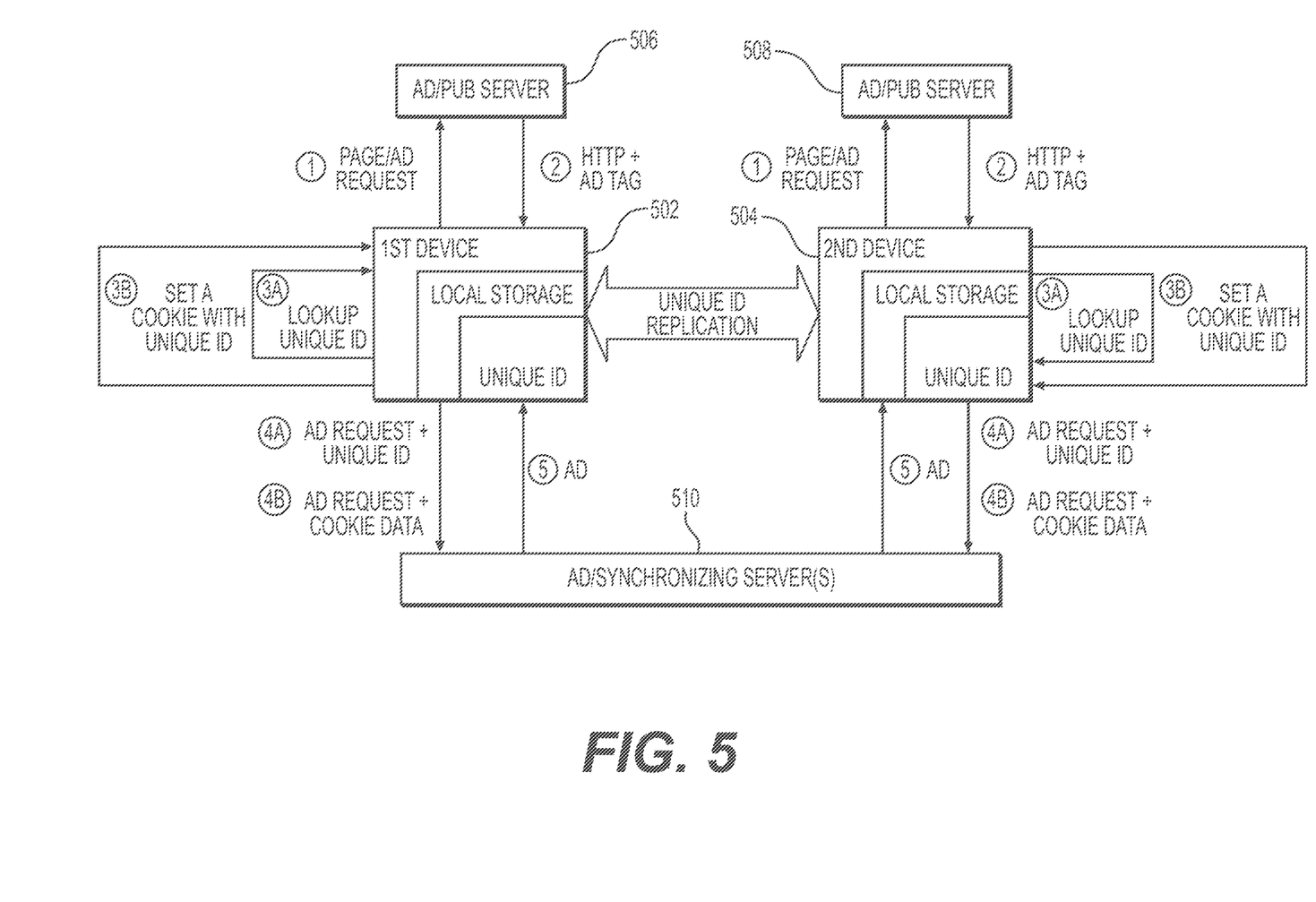
FIG. 5 is a schematic diagram of a flow for performing Internet advertising techniques based on user advertising IDs synchronized across devices and browsers, according to one or more embodiments.

Regardless of specific physical components or layout, one or more of ad servers 152 and synchronizing processor 154, or any other servers or systems associated with ad network involving ad servers 152 and synchronizing processor 154, may be programmed with instructions to perform a method of synchronizing user advertising IDs across devices and browsers, and performing online targeted and behavioral advertising across user devices, according to the exemplary disclosed methods, such as the exemplary methods described with respect to FIGS. 3-5 below.

FIG. 3 is a schematic diagram of the flow of information between entities for synchronizing user advertising IDs across devices and browsers, and performing online targeted and behavioral advertising across user devices, according to an exemplary embodiment of the present disclosure. Specifically, according to embodiments of the present disclosure, user devices 102-110, publisher servers 112, advertiser servers 114, and ad servers 152, may exchange data with one or more of synchronizing processor 154 and databases 156 of synchronization server systems 150 (all through one or more computers and/or servers connected to the Internet 101, as described with respect to FIG. 2).

Specifically, FIG. 3 depicts a method 300 for synchronizing user advertising IDs across devices and browsers. In one embodiment, method 300 may include determining whether a user's browser enables local storage. If so, method 300 may include creating in the user's browser a sandbox stored in the local storage system and registered to the advertising system (e.g., a network associated with ad servers 152 and/or synchronizing server system 150) (step 302).

Method 300 may also include creating and storing a unique identifier for the user in the created sandbox (step 304). For example, method 300 may include generating a unique ID that will be used to reference the user associated with the device in which the sandbox was created, as well as other devices that the user uses to access the Internet. In one embodiment, a unique ID may be any type of numeric or alpha-numeric identifier that can uniquely identify one user from another. In one embodiment, the unique ID may be stored in database 156 and indexed or otherwise related to a profile of information known about the user matching the unique ID.

Method 300 may also include optionally creating and storing an instance identifier specific to each of the user's devices (step 306). For example, if it is desirable to know—not only that a user is visiting certain sites or taking certain actions using multiple devices—but also, which device the user was using during those site visits or, in one embodiment, an instance identifier may be associated with each device, and web browsing history and actions may be stored in relation to the instance identifier. In another embodiment, database 156 may store a table or index containing a unique identifier for each user, and a plurality of instance identifiers indexed or related to the unique identifier, each instance identifier being indexed or related to a device of the user.

Method 300 may also include replicating data created in the sandbox across multiple browsers and local drives of the user's connected devices (step 308). For example, in some embodiments, where a user is using a browser that enables users to log-in or otherwise authenticate, and enables synchronizing local storage data remotely (i.e., "in the cloud"), that remotely stored data may be synchronized or replicated across all devices in which a user has logged-in or authenticated into such a browser.

FIG. 4 is a flow diagram of a method for performing Internet advertising techniques based on user advertising IDs being synchronized across devices and browsers, according to an exemplary embodiment of the present disclosure. Specifically, FIG. 4 depicts a method 400 for executing techniques between ad servers 152, synchronizing processor 154, and/or databases 156 of synchronizing server systems 150 to advertise to users based on data collected across a plurality of devices they may use.

In one embodiment, method 400 may include receiving, from a publisher, a request for an advertisement, the request including a unique identifier and/or instance identifier for a user or the user's device (step 402). While an ad request may be received from a publisher, an ad request may alternatively or additionally be received from the user or from the user's device. Specifically, an ad server 152 may receive a request to deliver an ad or ad tag to a user upon the user requesting and/or visiting a web page hosted on a publisher server 112.

In one embodiment, the ad request may include the unique ID assigned to the user, the instance ID assigned to the user's device, and/or cookie data containing one or both of the unique ID and the instance ID. As described above with respect to FIG. 3, the unique ID and/or instance ID may have been replicated through remote storage (e.g., cloud computing), across local storage of a plurality of the user's devices.

Method 400 may further include receiving, based on the unique identifier and/or instance identifier, a demographic or browsing history information generated from the user's use of a first device (step 404). Upon receiving the unique identifier and/or instance identifier, an ad server 152 and/or synchronizing processor 154 of the synchronizing server 150 may lookup demographic and/or browsing history information generated from the user's use of a first device. For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier.

Method 400 may further include determining, based on the demographic or browsing history information generated from the user's use of the first device, an advertisement to display to the user during the user's use of a second device (step 406). Specifically, when a user uses a second device to request web content, e.g., from a publisher server 112, the user's second device may also request an ad from an ad server 152. Because the user's second device may send an ad request containing the user's unique identifier or instance identifier, the ad servers 152 and/or synchronizing processor 154 may again lookup demographic or browsing history information generated from the user's use of a first device. For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier. As a result, the ad servers 152 and/or synchronizing processor 154 may be able to serve ads on the user's device based on one or more of: browsing history, demographic data, behavioral information, user profiling information, purchase history, any or all of which may be based on data collected from more than one device used by the user.

In general, publishers 112 may host websites having web pages that display content and advertising. In general, when a user uses a device 102-110 to visit a web page hosted on a publisher server 112, the publisher may send an impression request to an ad network, in this case, an ad server 152. In the impression request, the publisher 112 may request an advertisement to display to the visiting user. The impression request may include any data elements normally included in an impression request, such as information about the web page, the publisher, and/or the visiting user. The advertising system may select an advertisement for the publisher to display based on an algorithm that considers the received information about the web page, the publisher, and/or the visiting user. Thus, the Internet advertising system may, consistent with its ad bidding and exchange techniques and various business rules, award impressions of ads to impression requests from publisher servers 112. In other words, the Internet advertising system, through ad servers 152, may cause ads received from advertiser servers 114 to be displayed on web pages hosted on publisher servers 112 when users devices 102-110 request those web pages. Of course, as discussed above, the display of the ads may be precisely targeted both to the identities of the users and publishers of servers 112, and the content of the publisher's web page. For example, the Internet advertising system may select for display the ad that is most likely to generate a strong and favorable reaction from the visiting user, based on assumptions, historical data, and statistics gathered about the publisher's site and the user.

FIG. 5 is a schematic diagram of a flow for performing Internet advertising techniques based on user advertising IDs synchronized across devices and browsers, according to an exemplary embodiment of the present disclosure. Specifically, FIG. 5 depicts the flow of requests between a user's first device 502 and an ad or publisher server 506 and an ad or synchronizing server 510. FIG. 5 also depicts the flow of requests between a user's second device 504 and an ad or publisher server 508 and an ad or synchronizing server 510.

As described above, the user's first device 502 and second device 504 may be any type of device 102-110 described with respect to FIGS. 1 and 2. Also, it should be appreciated that any number of devices may be applicable within the scope of the description of FIG. 5. In addition, it should be appreciated that, although depicted as different, ad or publisher servers 506, 508 may optionally be the same server; and although depicted as a single server system, ad or synchronizing server(s) 510 may be separate and distinct servers accessed by the user's multiple devices, such as devices 502, 504. In one embodiment, the ad or publisher servers 506, 508 may correspond to publisher or advertiser servers 112, 114, and/or the ad or synchronizing server(s) 510 may correspond to the ad servers 152, synchronizing processor 154, and/or databases 156 of synchronizing server system 150.

As shown in FIG. 5, in one embodiment, the user's first device 502 may (1) request a web page or ad from an ad or publisher server 506; and (2) receive HTTP and an ad tag from the ad or publisher server 506. The user's first device 502 may execute the ad tag, such as by executing any type of client side script (e.g., JavaScript) to (3A) look-up a unique ID stored on the device. As described above, the unique ID may be stored within local storage associated with a browser of the device 502. The user's first device 502 may then (4A) issue an ad request to ad or synchronizing servers 510, where the request includes the looked-up unique ID. As an alternative to transmitting the unique ID in an ad request, the user device 502 may (3B) set a cookie containing the unique ID in location storage, and then (4B) issue an ad request to ad or synchronizing servers 510, where the ad request includes cookie data that may or may not include the unique ID. In one embodiment, the set cookie may include another type of advertising identifier that is cross-referenced to the user through the unique ID.

The ad or synchronizing servers 510 may then store any data relating to the user of the user device 502 in relation to a cookie ID or unique ID, such as browsing history, demographic data, behavioral information, user profiling information, purchase history, etc. As described above, because the unique ID may be replicated across local storage of several devices associated with the user, the ad or synchronizing servers 510 may target ads based on a more complete picture of a user's demographic or behavioral history. For example, the unique ID stored in local storage of the user's first device 502 may be replicated into local storage of the user's second device 504.

Accordingly, when the same user uses the second device 504 to access web pages using the same unique ID, the ad or synchronizing servers 510 may access information and data collected with respect to the user's use of the first device when determining which content and advertising to server to the user. Specifically, the user's second device 504 may (1) request a web page or ad from an ad or publisher server 508; and (2) receive HTTP and an ad tag from the ad or publisher server 508. The user's second device 504 may execute the ad tag, such as by executing any type of client side script (e.g., JavaScript) to (3A) look-up a unique ID stored on the device. As described above, the unique ID may be stored within local storage associated with a browser of the second device 504. The user's second device 504 may then (4A) issue an ad request to ad or synchronizing servers 510, where the request includes the looked-up unique ID. As an alternative to transmitting the unique ID in an ad request, the user device 504 may (3B) set a cookie containing the unique ID in location storage, and then (4B) issue an ad request to ad or synchronizing servers 510, where the ad request includes cookie data that may or may not include the unique ID. In one embodiment, the set cookie may include another type of advertising identifier that is cross-referenced to the user through the unique ID. Because the unique ID may be replicated across local storage of several devices associated with the user, the ad or synchronizing servers 510 may target ads based on a more complete picture of a user's demographic or behavioral history.

For example, the ad or synchronizing server(s) 510 may determine, based on the demographic or browsing history information generated from the user's use of the first device, an advertisement to display to the user during the user's use of a second device. Specifically, when a user uses a second device to request web content, e.g., from a publisher server 112, the user's second device may also request an ad from an ad server 152. Because the user's second device may send an ad request containing the user's unique identifier or instance identifier, the ad servers 152 and/or synchronizing processor 154 may again lookup demographic or browsing history information generated from the user's use of a first device. For example, the ad server 152 and/or synchronizing processor 154 may search databases 156 for the unique identifier and/or instance identifier to find indexed browsing history, demographic data, behavioral information, user profiling information, purchase history, etc. The stored historical data may be data generated from the user's first device or any other device having local storage containing the unique identifier and/or instance identifier. As a result, the ad servers 152 and/or synchronizing processor 154 may be able to serve ads on the user's device based on one or more of: browsing history, demographic data, behavioral information, user profiling information, purchase history, any or all of which may be based on data collected from more than one device used by the user.

Figure 6:
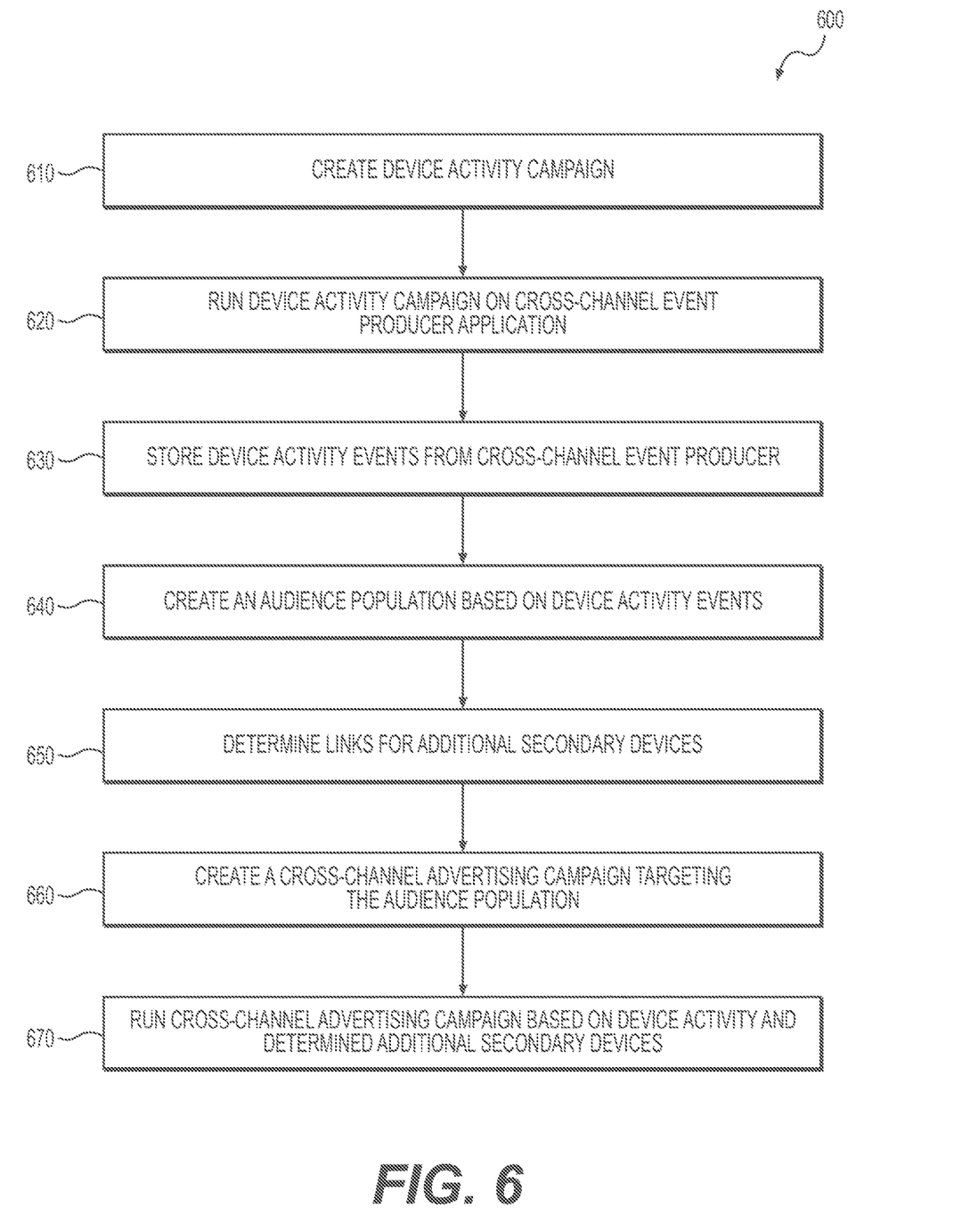
FIG. 6 depicts a flowchart of a method of providing targeted content across user channels, according to one or more embodiments.

User activity by which users access the Internet, as depicted in FIGS. 1 and 2, may be considered to be one channel of user activity. Other type of activity, such as placing or receiving telephone calls using mobile device 102, as depicted in FIG. 1, may be considered to be a different channel of user activity. According to one or embodiments, activity in one channel may be used to serve ads on a user's device in a different channel. For example, a user's Internet activity such as, for example, browsing history, demographic data, behavioral information, user profiling information, purchase history, etc., may be used to serve ads on a user's mobile device when placing or receiving a telephone call. FIG. 6 depicts a flowchart of a method of providing targeted content across user channels, according to one or more embodiments.

As shown in FIG. 6, at operation 610, synchronizing server 150 may create a device activity campaign. At operation 620, synchronizing server 150 may run the device activity campaign on a cross-channel event producer application, which may be run on a user device, such as one of user devices 102-110 depicted in FIGS. 1 and 2. At operation 630, synchronizing server 150 may store device activity events received from cross-channel event producer application. At operation 640, synchronizing server 150 may create an audience population based on the stored device activity events. At operation 650, synchronizing server 150 may determine links for additional secondary user devices, such as one or more of user devices 102-110 depicted in FIGS. 1 and 2. Links for additional secondary user devices may be determined, for example, by method 300 depicted in FIG. 3 and discussed in detail above. At operation 660, synchronizing server 150 may create a cross-channel advertising campaign targeting the audience population. The cross-channel advertising campaign may be created, for example, by method 400 depicted in FIG. 4 and discussed in detail above. At operation 670, synchronizing server 150 may run the cross-channel advertising campaign based on the device activity and the determined additional secondary user devices.

Figure 8A:
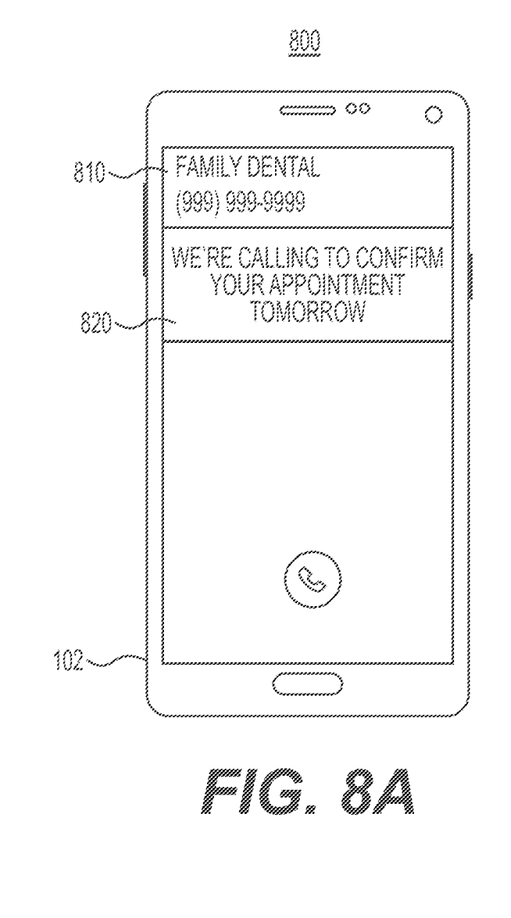
FIGS. 8A-8C depict example user interfaces providing targeted content across user channels, according to one or more embodiments.
Figure 8B:
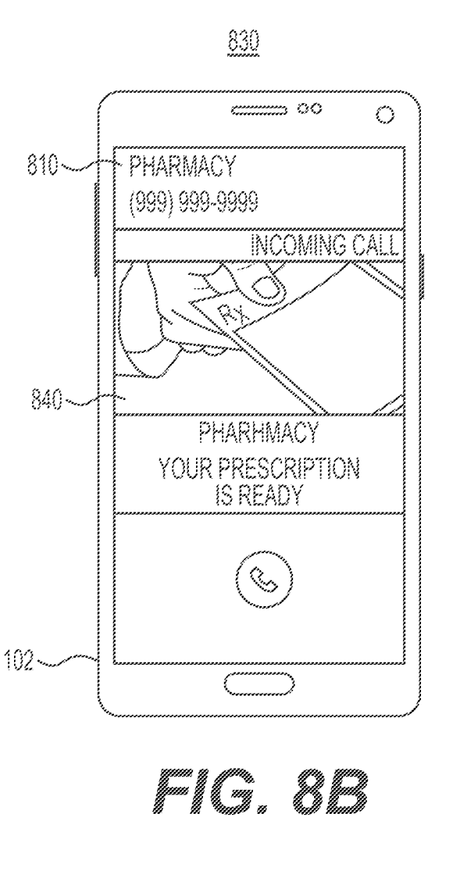
Figure 8C:
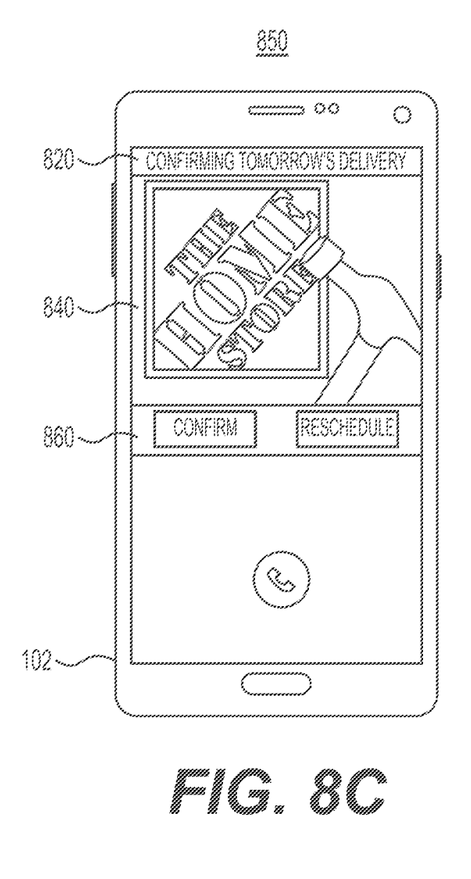

The cross-channel advertising campaign may target ads displayed on the secondary user devices, such as Internet connected user devices, based on telephone calls placed or received on a user's mobile device or smartphone. Alternatively, advertisements may be displayed during the user's telephone call based on the connected telephone number and/or the user's Internet activity on the user's mobile device or smartphone or the determined additional secondary user devices. For example, as advertisement or targeted message may be displayed on a caller ID screen of the user's mobile device or smartphone, as depicted in FIGS. 8A-C. As shown in FIGS. 8A-C, an advertisement or targeted message displayed on a caller ID screen of the user's mobile device or smartphone may be, for example, text-based (FIG. 8A), informative (FIG. 8B), or interactive (FIG. 8C). A text-based advertisement or targeted message, as shown in FIG. 8A, may include only text elements. An informative advertisement or targeted message, as shown in FIG. 8B, may further include graphical elements or other elements that may provide richer information to the user. An interactive advertisement or targeted message, as shown in FIG. 8C, may further include user interface elements that may allow the user to interact with the message to convey information to the advertiser or originator of the advertisement or targeted message. An advertisement or targeted message, such as depicted in FIGS. 8A-C may be sent in connection with an existing transaction with a customer, such as, for example, confirming an appointment or scheduling a delivery. However, an advertisement or targeted message may also be sent to a user who is not an existing customer. For example, an advertiser, or other content provider, may provide a list of telephone numbers and information, possibly including graphics and/or text messages, to be displayed to the user. Based on events recorded during such a call, digital retargeting advertisements may be run according to the user information and determined additional secondary user devices.

Alternatively, an advertisement or targeted message may be displayed on a dialer screen of a user's mobile device or smartphone. Such an advertisement or targeted message may be displayed in response to a phone number dialed by the user, selected from a contacts list, accessed within an email or other message, or accessed within a web site or other content displayed on a user device, for example. Such an advertisement or targeted message may further include user interface elements allowing the user to interact with the message to convey information to the advertiser or originator of the advertisement or targeted message, or to initiate further interaction with the advertiser or originator of the advertisement or targeted message. For example, user interface elements may allow the user to initiate interaction with a merchant's automated customer support system.

The advertisement or targeted message may include identifying information 810, such as, for example, a name and phone number of a calling business, a text message 820, and graphic content 840. Text message 820 may be provided by the business originating the incoming call and may relate to the nature of the call, such as, for example, confirming an upcoming appointment. Graphic content 840 may be, for example, an image, a drawing, an animation, or a video, etc., and may be an advertising image provided by the business originating the incoming call. Alternatively, graphic content 840 may be related to an advertiser other than the originator of the phone call and may be provided based on the user's Internet activity on the determined additional secondary user devices. The advertisement or targeted message may further include an interactive portion 860, which may include buttons or other user interface elements that may allow the user to interact with the advertiser without answering the phone call.

Figure 7:
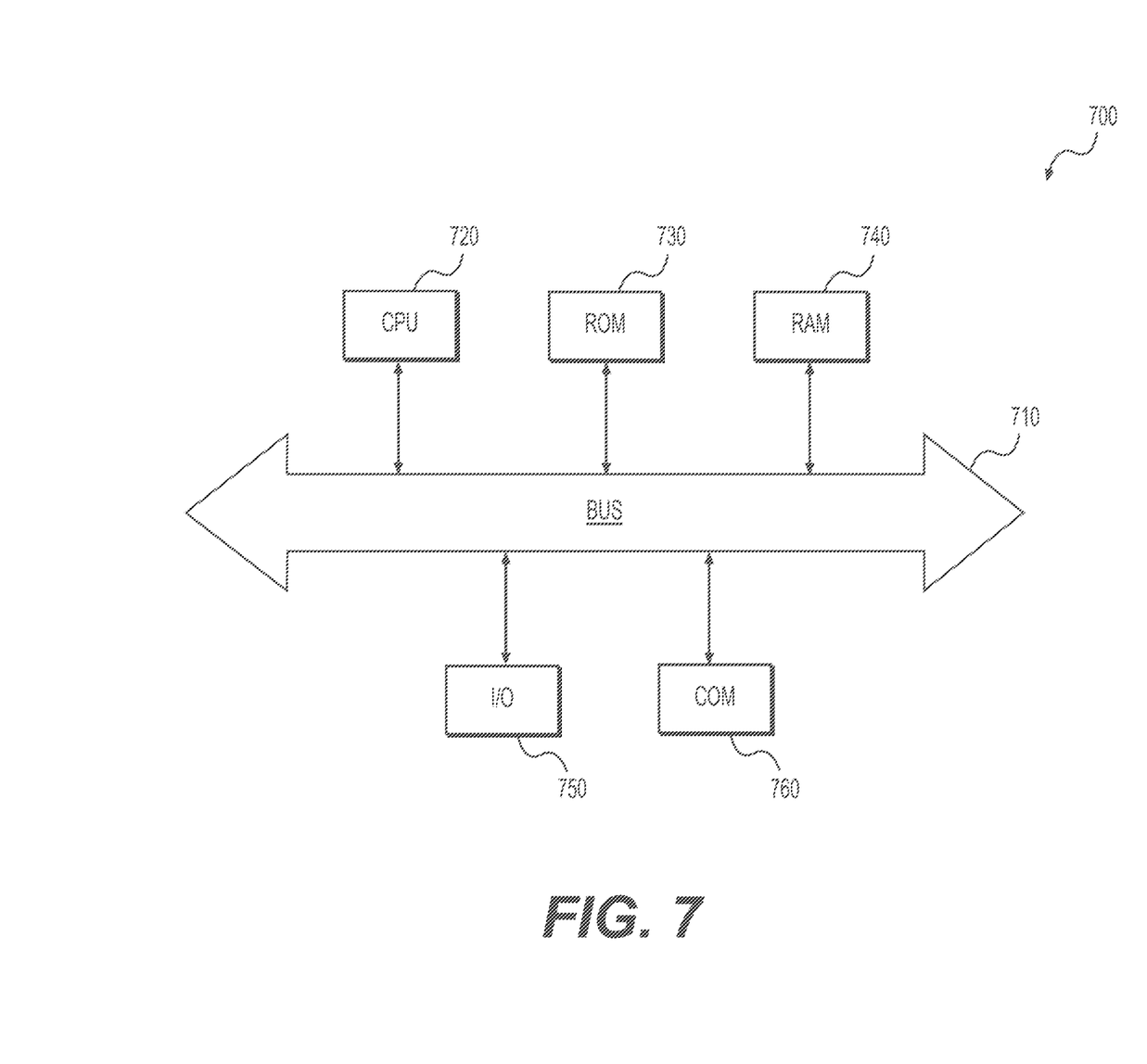
FIG. 7 depicts an exemplary device in which one or more embodiments may be implemented.

FIG. 7 illustrates a high-level functional block diagram of an exemplary device 700, in which embodiments of the present disclosure, or portions thereof, may be implemented, e.g., as computer-readable code. For example, each of the exemplary systems, user interfaces and methods described above with respect to FIGS. 1-5 can be implemented in device 700 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-6 and 8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-6 and 8 may be implemented using device 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines.

In addition, in some embodiments the order of operations may be rearranged without departing from the spirit of the disclosed subject matter.

As shown in FIG. 7, device 700 may include a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example, a bus, message queue, network, or multi-core message-passing scheme.

Device 700 may also include a main memory 740, for example, random access memory (RAM), and may also include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

Device 700 may also include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing electronic content across user channels, the method comprising:
   creating, by a synchronizing server, a cross-channel electronic content campaign comprising interactive electronic content determined based on stored device activity events occurring on a primary user device associated with a user;
   receiving, by the synchronizing server, a user request for a web page from a publisher of the cross-channel electronic campaign;
   in response to the user request, setting, by the primary user device, a cookie on the primary user device, the cookie containing an advertising identifier of a second user device that is cross-referenced through a unique ID of the user to the primary user device;
   running, by the synchronizing server, the cross-channel electronic content campaign by transmitting the determined electronic content of the cross-channel electronic content campaign to the secondary user device associated with the user through the unique ID associated with the cookie, such that the interactive electronic content is displayed on the secondary user device when a call received from an originator of the determined electronic content relates to confirming a preexisting appointment with the originator or scheduling a delivery with the originator; and
   transmitting to the originator of the electronic content, by the synchronizing server, information provided by the user based on the user interacting with the displayed electronic content, the interaction comprising scheduling or confirming an appointment.

2. The method of claim 1, wherein the determined electronic content is displayed on a caller ID screen of a user's device.

3. The method of claim 2, wherein the determined electronic content comprises one or more of a textual message, graphical elements, and user interface elements allowing the user to convey information to the originator of the determined electronic content.

4. The method of claim 2, wherein the determined electronic content is sent in connection to a previous transaction between the user and the originator of the determined electronic content.

5. The method of claim 1, wherein the determined electronic content is configured to accept a response other than a voice communication from the user of the secondary user device.

6. The method of claim 1, the method further comprising:
   creating a device activity campaign; and
   running the device activity campaign on the primary user device.

7. The method of claim 6, wherein the device activity campaign is run on a cross-channel event producer application on the primary user device.

8. A non-transitory computer readable medium storing a program causing a computer to execute a method of providing electronic content across user channels, the method comprising:
   creating, by a synchronizing server, a cross-channel electronic content campaign comprising interactive electronic content determined based on stored device activity events occurring on a primary user device associated with a user;

receiving, by the synchronizing server, a user request for a web page from a publisher of the cross-channel electronic campaign;

in response to the user request, setting, by the primary user device, a cookie on the primary user device, the cookie containing an advertising identifier of a second user device that is cross-referenced through a unique ID of the user to the primary user device;

running, by the synchronizing server, the cross-channel electronic content campaign by transmitting the determined electronic content of the cross-channel electronic content campaign to the secondary user device associated with the user through the unique ID associated with the cookie, such that the interactive electronic content is displayed on the secondary user device when a call received from an originator of the determined electronic content relates to confirming a preexisting appointment with the originator or scheduling a delivery with the originator; and transmitting to the originator of the electronic content, by the synchronizing server, information provided by the user based on the user interacting with the displayed electronic content, the interaction comprising scheduling or confirming an appointment.

9. The non-transitory computer readable medium of claim 8, wherein determined electronic content is displayed on a caller ID screen of a user's device.

10. The non-transitory computer readable medium of claim 9, wherein the determined electronic content comprises one or more of a textual message, graphical elements, and user interface elements allowing the user to convey information to the originator of the determined electronic content.

11. The non-transitory computer readable medium of claim 9, wherein the determined electronic content is sent in connection to a previous transaction between the user and the originator of the determined electronic content.

12. The non-transitory computer readable medium of claim 8, wherein the determined electronic content is configured to accept a response other than a voice communication from the user of the secondary user device.

13. The non-transitory computer readable medium of claim 8, the method further comprising:
creating a device activity campaign; and
running the device activity campaign on the primary user device.

14. The non-transitory computer readable medium of claim 13, wherein the device activity campaign is run on a cross-channel event producer application on the primary user device.

15. A computer system for providing electronic content across user channels, the computer system comprising:
a memory having processor-readable instructions stored therein;
and a processor configured to access the memory and execute the processor-readable instructions, which when executed by the processor configures the processor to perform a plurality of functions, including functions to:

create a cross-channel electronic content campaign comprising interactive electronic content determined based on stored device activity events occurring on a primary user device associated with a user;

receive, by a synchronizing server, a user request for a web page from a publisher of the cross-channel electronic campaign;

in response to the user request, set, by the primary user device, a cookie on the primary user device, the cookie containing an advertising identifier of a second user device that is cross-referenced through a unique ID of the user to the primary user device;

run the cross-channel electronic content campaign by transmitting the determined electronic content of the cross-channel electronic content campaign to the secondary user device associated with the user through the unique ID associated with the cookie, such that the interactive electronic content is displayed on the secondary user device when a call received from an originator of the determined electronic content relates to confirming a preexisting appointment with the originator or scheduling a delivery with the originator;

and transmitting to the originator of the electronic content, information provided by the user based on the user interacting with the displayed electronic content, the interaction comprising scheduling or confirming an appointment.

16. The computer system of claim 15, wherein the determined electronic content is displayed on a caller ID screen of a user's device.

17. The computer system of claim 16, wherein the determined electronic content comprises one or more of a textual message, graphical elements, and user interface elements allowing the user to convey information to the originator of the determined electronic content.

18. The computer system of claim 16, wherein the determined electronic content is sent in connection to a previous transaction between the user and the originator of the determined electronic content.

19. The computer system of claim 15, wherein the determined electronic content is configured to accept a response other than a voice communication from the user of the secondary user device.

20. The computer system of claim 15, wherein the plurality of functions performed by the processor when executing the processor-readable instructions further includes functions to:
creating a device activity campaign; and
running the device activity campaign on the primary user device.

* * * * *